United States Patent [19]
White

[11] 3,886,492
[45] May 27, 1975

[54] SONIC INSECT REPELLER

[75] Inventor: Herbert Montgomery White, Carleton Place, Ontario, Canada

[73] Assignee: John Joseph Szmigielski, Ontario, Canada; a part interest

[22] Filed: Oct. 10, 1972

[21] Appl. No.: 296,075

[30] Foreign Application Priority Data
Oct. 7, 1971 Canada ................ 124720

[52] U.S. Cl. ............... 340/15; 43/132 R; 181/.5 R
[51] Int. Cl. ............................... H04b 11/00
[58] Field of Search ........... 340/3 A, 15; 181/.5 R; 43/124, 131, 132

[56] References Cited
UNITED STATES PATENTS

| | | | |
|---|---|---|---|
| 3,058,103 | 10/1962 | Evans | 340/3 A |
| 3,305,824 | 2/1967 | Brooks | 340/3 A |
| 3,503,039 | 3/1970 | Aniskovicz | 340/3 A |
| 3,557,899 | 1/1971 | Longinette | 181/.5 R |

*Primary Examiner*—Maynard R. Wilbur
*Assistant Examiner*—N. Moskowitz
*Attorney, Agent, or Firm*—Lane, Aitken, Dunner & Ziems

[57] ABSTRACT

An electronic sound generator generates a wide range of sound frequencies which will repel insects from the area where the sound frequencies are prevalent, and with production of said frequencies maintained at sound power levels and tonal qualities which are offensive to selected insects but which are not dangerous or offensive to animals or humans. The sound is generated by means of a unijunction sawtooth oscillator and a crystal ceramic transducer. The oscillator employs the unijunction transistors to generate a sawtooth waveform, the frequency of which is varied or swept over a selected range. In addition, the sawtooth generated by the unijunction produces high frequency noise at its peaks which results in a broad frequency spectrum being produced ranging from about 10 kilohertz up to about 150 kilohertz.

8 Claims, 5 Drawing Figures

SONIC INSECT REPELLER

BACKGROUND OF THE INVENTION

It is well established thorugh Entomological research in many countries that insects are responsive to particular sound frequencies and may be repelled or attracted by these sounds in a variety of situations. However, the research programs carried out to date have proceeded with specific frequencies produced and measured in relation to a single species of insect and also in the majority of cases using higher power intensities, whether for attraction or repulsion purposes. These programs have utilized as a basic premise that insects are repelled by sounds produced by natural predators and conversely the insects may be attracted by sounds produced during the mating cycle inherent to each species. As previously indicated, experimental programs with detailed results have shown which insects and to what degree each species are affected by sounds in nature. It has also been possible to produce laboratory simulations of the natural sounds while duplicating the various environmental conditions which would be expected in the insects' normal life cycle such as temperature, humidity and the like.

Basically it can be stated that most insects are affected by frequencies below 100 kilohertz and in fact are specifically attracted or repelled by one or more given frequencies.

Some insects can be discouraged from an area while they are in flight because their tympanal organs detect the emitted sounds from the repelling device and translate this information into protective reactions in a similar fashion to that which would occur when detection of echolocating sounds of their predators took place.

Other insects can be repelled from an area when in a resting state by the overall reaction caused by sound pressure gradients and if the sound level is sufficiently high and the physical mass of the insect co-relates to displacement of air molecules caused by the emitted sound, the insect will move away from the sound source whether or not its sensory apparatus indicates the necessity of flight activity or crawling further from the offending sounds.

In general, it may be stated that all insects respond to sounds at some frequency and at certain intensities so that by application of artificial sound to the phonotactic and phonokinetic behavioural responses of each species, it is possible to exclude the insects from predictable dimensional areas.

For example, female mosquitoes have an antipathy to sonic frequencies from 11 to 12 kilohertz and from 36 to 38 kilohertz. Since only the female mosquities bite and since the males will follow the exodus of the females, the problem of eliminating mosquitoes may be solved by generating sonic frequencies concentrated in these ranges.

The methods of the prior art utilized single or limited frequency signals which in order to be effective involved high intensities and were, therefore, objectionable and even dangerous to higher order animals and humans.

SUMMARY OF THE INVENTION

In contrast to normal procedures which have utilized single frequency tones or sine waves, this invention provides a multitude of frequencies which are continuously changing from the lowest to the highest frequencies with a rapid turn off at the highest selected point and fast drop to the low frequency starting point.

In accordance with the present invention, a sawtooth waveform with a frequency cyclically sweeping from 10 to 50 kilohertz is generated by a unijunction oscillator using two oscillating unijunction transistors. The particular oscillator circuit causes the fundamental frequency to vary with time and also produces high frequency noise or hash at the peaks of the sawtooth waveform. The resulting waveform has a frequency spectrum ranging from about 10 kilohertz to 150 kilohertz. When the waveform is converted into sound by a transducer, the resulting sound is highly effective in repelling insects. It is believed that the sound waveform is particularly effective in repelling insects in part because of the cyclically varying fundamental waveform, in part because of the frequency spectrum that is produced by the system of the present invention, and in part because of the fact that the high frequency noise produced at the peaks of the sawtooth is generated intermittently.

BRIEF DESCRIPTION OF THE DRAWINGS

As shown in FIG. 1, the free running oscillator of the present invention comprises a pair of unijunction transistors $Q_1$ and $Q_2$. The unijunction transistors, which are identified by model No. GE2N2646, have an emitter voltage current characteristics, as is illustrated in FIG. 3. One base of the unijunction transistor $Q_1$ is connected through a variable 10 kilohm resistor $R_1$ and an on-off switch 11 to the positive side of a 9 volt battery applied at terminal 13. The other base of the transistor $Q_1$ is connected through a 47 ohm resistor $R_2$ to ground, to which the negative side of the 9 volt battery is connected. A one microfarad capacitor C is connected between the emitter of the unijunction transistor $Q_1$ and ground. The emitter of the unijunction transistor $Q_1$ is also connected to the switch 11 through a 56 kilohm resistor $R_3$ and also to the emitter of the unijunction transistor $Q_2$ through a 330 kilohm resistor $R_4$. One base of the unijunction transistor $Q_2$ is connected through a 470 ohm resistor $R_6$ to the 9 volt source supplied by the on-off switch 11 and the other base of the unijunction transistor $Q_2$ is connected to ground through a 47 ohm resistor $R_7$. A crystal transducer 15 having an infinite resistance and having a capacitance of 540 picofarads is connected between the emitter of the unijunction transistor $Q_1$ and ground. Alternatively, a ceramic transducer may be used in place of the crystal transducer, which is of the type normally used in earpieces of hearing aids. The emitter of the transducer $Q_2$ is also connected through a 330 kilohm resistor $R_5$ to the positive side of the 9 volt battery applied through the switch 11.

The unijunction transistor $Q_2$ coacts with the RC circuit comprising the capacitance of the crystal transducer and the resistor $R_5$ to oscillate and generate a sawtooth waveform at a frequency which varies from 10 kilohertz to 50 kilohertz. This sawtooth is converted to sound by the crystal transducer 15. The unijunction transistor Q1 coacts with the RC circuit comprising the capacitor $C_1$ and the resistor $R_3$ to oscillate and generate a sawtooth waveform at a lower frequency. The sawtooth waveform generated by the unijunction transistor Q1 causes the frequency of the sawtooth generated by the unijunction $Q_2$ to vary cyclically or sweep between 10 kilocycles and 50 kilocycles per second. The frequency of oscillation of the unijunction Q1 and thus the frequency at which the sonic signal is swept between 10 and 50 kilocycles is determined by the setting of the variable resistor $R_1$ and can be varied between 6 and 40 cycles per second.

Figure 1:
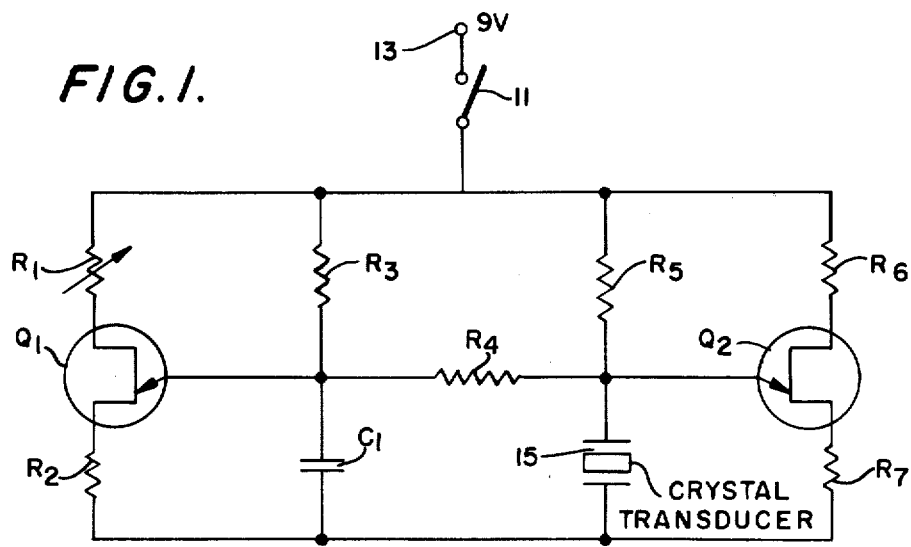
FIG. 1 is a circuit diagram illustrating the free running oscillator and sound generator of the present invention.
Figure 2:
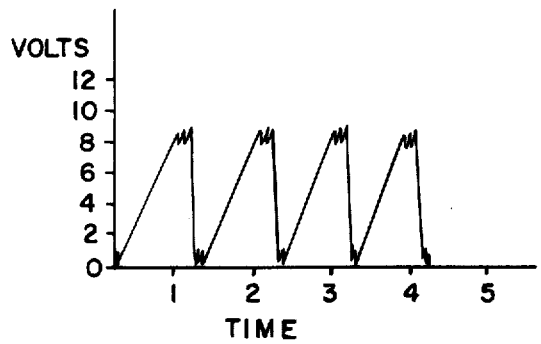
FIG. 2 illustrates the waveform generated by the circuit of FIG. 1.
Figure 3:
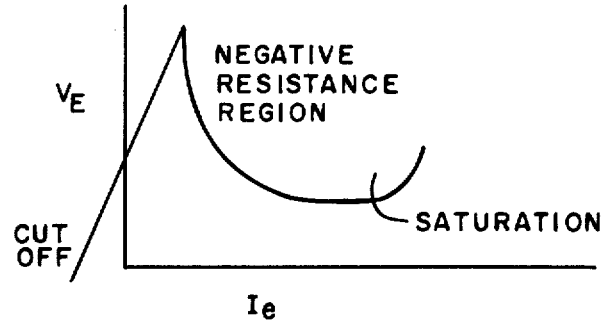
FIG. 3 illustrates the voltage current characteristic of a unijunction transistor.
Figure 4:
FIG. 4 is a graph illustrating one cycle of the sawtooth generated by the circuit of the invention showing the noise generated at the peaks of the sawtooth.

The sawtooth sonic signal generated by the circuit of FIG. 1 is illustrated in FIG. 2. High frequency noise or hash including ultrasonic components occur at the peaks of the sawtooth as a result of the fact that the sawtooth is generated by the firing of a unijunction transistor. The high frequency noise formed on the peak of the sawtooth is illustrated in more detail in FIG. 4. Thus, the high frequency and ultrasonic noise components are produced intermittently.

Because of the fact that the fundamental frequency of the sawtooth waveform is cyclically varied over a wide range and includes harmonics which are likewise swept over a wide range and because of the high frequency noise components that occur at the peaks of the sawtooth waveform, the resulting sonic wave that is produced has a frequency spectrum ranging from 10 to 150 kilohertz. The power of the signal applied to the transducer is 12 milliwatts between 10 and 50 kilohertz and 3 milliwatts at 100 kilohertz. It is believed that to be effective that the upper limit of the range need be only 100 kilohertz since most insects are affected by frequencies under this value. As a result of the wide frequency spectrum, the cyclic variation in the fundamental frequency and because of the intermittent high frequency noise produced at the peaks of the sawtooth, a highly effective sonic insect repeller is achieved.

Figure 5:
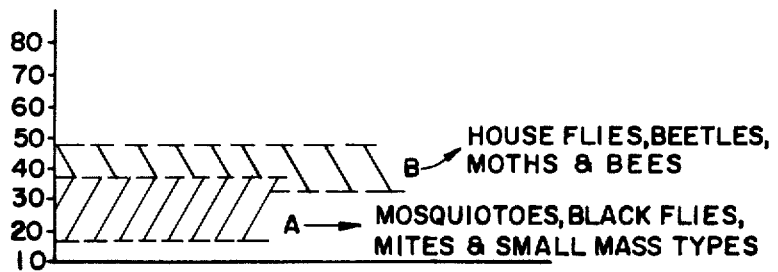
FIG. 5 is a graph illustrating frequencies at which common insects are repelled.

As shown in FIG. 5, mosquitos, black flies and mites are repelled at frequencies ranging from about 30 kilohertz to 48 kilohertz and whereas house flies, beetles, and moths are repelled at frequencies ranging from about 7 kilohertz to 37 kilohertz. By varying the value of the resistor $R_1$, the concentration of the frequencies produced by the circuit of the present invention can be made to increase concentrations in either of these ranges or in other ranges and thus increase the effectiveness of the signal produced against the particular insect.

Practical experiments have shown that the minimum zone that needs to be protected by sonic repulsion for any one person is a cone of about 10 feet in diameter at ground level, which cone extends to a point not less than 3 feet above the head of the person to be protected. To provide such a zone of protection, the sound producing unit may be aimed vertically down from above a person to be protected.

It will be appreciated the standard techniques for controlling direction and intensity in dispersion of sound may be utilized with the device of this invention to obtain maximum protection with the power output available from a standard unit and that by use of amplification the protected area may be greatly increased and other directional patterns provided.

It is contemplated that the device may be incorporated in an integrated circuit and capsulated with and powered by a mercury button cell such as the type used in hearing aids. The device, therefore, thus may be made in miniature powered form providing a unit of approximately the size of an overcoat button which can be attached for convenience to a person's clothing such that the sounds emitted by the unit afford protection from biting or stinging insects by discouraging insects from the immediate vicinity.

I claim:

1. A sonic insect repeller comprising oscillator means including a unijunction transistor coacting with a BC circuit for generating an output signal with a sawtooth waveform having a fundamental frequency and having substantially higher harmonics, said signal including noise components at frequencies substantially higher than said fundamental frequencies and occurring only at the peaks of said sawtooth waveform, means for cyclically varying said fundamental frequency over a selected range, and a transducer for converting said signal into a sonic waveform.

2. A sonic insect repeller as recited in claim 1 wherein, said signal has a frequency spectrum covering the range from 10 to 100 kilohertz.

3. The sonic insect repeller as recited in claim 1, wherein said transducer includes a crystal transducer.

4. A sonic insect repeller as recited in claim 1, wherein said transducer includes a ceramic transducer.

5. A sonic insect repeller as recited in claim 1, wherein said transducer forms a capacitive element in said RC circuit.

6. A sonic insect repeller as recited in claim 1, wherein said means for varying said fundamental frequency of said output signal includes another oscillator including another unijunction transistor coacting with another RC circuit for generating a control signal with a sawtooth waveform of substantially lower fundamental frequency than that of said output signal, and means interconnecting said two oscillators for causing the fundamental frequency of said output signal to be cyclically varied in accordance with the fundamental frequency of said control signal.

7. A sonic insect repeller as recited in claim 6, wherein the RC circuit in each of said two oscillators includes a resistive portion and a capacitive portion interconnected via a junction, said interconnecting means between the two oscillators including a resistive connection between the respective junctions of said RC circuits, the capacitive portion of the RC circuit for said output signal oscillator including said transducer.

8. A sonic insect repeller as recited in claim 7, wherein said selected range of the fundamental frequency of said output signal is from 10–100 kilohertz and the fundamental frequency of said control signal is between 6 and 40 hertz.

* * * * *